C. WIRTH.
Harrow.
No. 218,846. Patented Aug. 26, 1879.
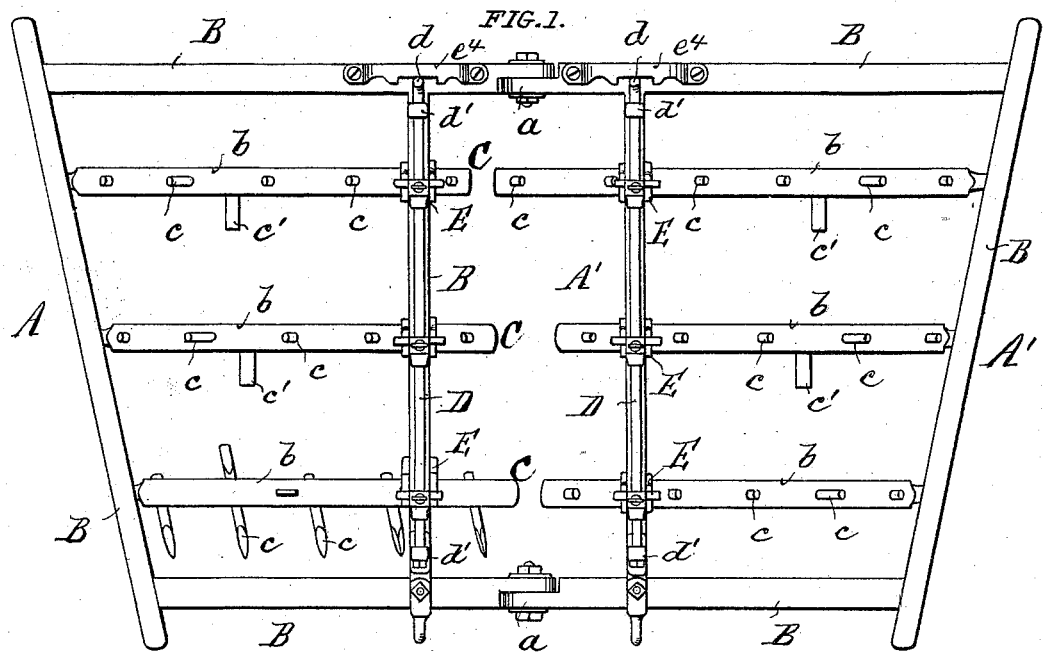
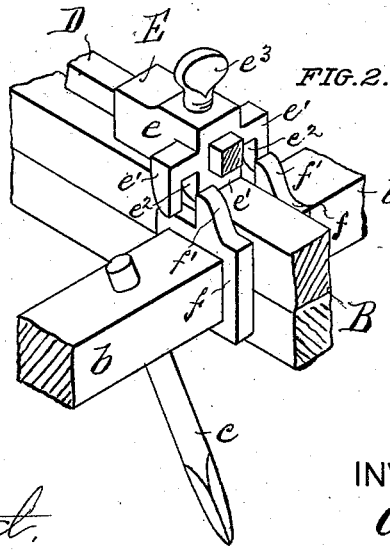
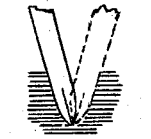
ATTEST:
John W. Herthel
Chas. Herthel
INVENTOR:
Christian Wirth
per Herthel & Co

UNITED STATES PATENT OFFICE.

CHRISTIAN WIRTH, OF GODFREY, ILLINOIS.

IMPROVEMENT IN HARROWS.

Specification forming part of Letters Patent No. 218,846, dated August 26, 1879; application filed June 13, 1879.

*To all whom it may concern:*

Be it known that I, CHRISTIAN WIRTH, of Godfrey, Madison county, and State of Illinois, have invented an Improved Harrow, of which the following is a specification.

My invention relates to that class of harrows which, in operation, can have the teeth thereof made to revolve or be set and held in different positions, for purposes of adapting the harrow to the nature of the work required to be done.

I will first fully describe the construction and operation of my improvements, and hereinafter point out the novel features thereof in the claims.

Of the drawings, Figure 1 is a plan; Fig. 2, an enlarged detail of parts that secure the turn-bar, carrying the teeth, in different positions.

As shown in Fig. 1, my harrow is composed of two parts or sections, A A', hinged together at $a$. Each part or section of the harrow is complete in itself and can be used separately. I prefer to hinge the sections A A' together, as shown, for purposes of harrowing prairie land. The hinge $a$ permits the sections to adapt themselves in harrowing to any unevenness of ground, or the better to suit the surface of the land.

B represents the main frame. C represents the turn-bars, which are arranged and journaled in the sections A A', in the manner indicated in Fig. 1. $c$ represents a series of ordinary harrow-teeth. These are rigidly fastened to each turn-bar, so as to project sufficiently downward to penetrate the soil. Some of the teeth $c$ are long enough to project also upward, (see Fig. 1,) in order that when the lower part of the said teeth is drawn out of the ground the other part will catch and enter the ground and revolve the turn-bars. Thus a rotary harrow is had. $c'$ are proper projections, that likewise answer for the purpose of causing the turn-bars to revolve. As shown, the teeth slant from the perpendicular—say, about seventy degrees—and their points enter the soil therefore on an incline in one direction, while in reversing the direction of the harrow its teeth enter the soil in an opposite incline manner, thus producing a V-shaped rut. The soil contained in the angle of the V is thus the better loosened, broken, or harrowed.

My improvements relate to the combination of parts by means whereof the harrow-teeth can be adjusted and secured in different positions to suit the nature of the soil, the seed, or growth to be cultivated. The said parts, in their construction and operation, are as follows:

D is a lever attachment, consisting of a rod terminating at one end in a hand-lever, $d$. This lever-rod is journaled in proper bearings at $d'$, on top of one of the frame sides of B. (See figures.) E represents the couplings in their entirety, one of which exists for every turn-bar carrying teeth. The construction of the coupling E (all are alike) is more clearly shown in Fig. 2. It consists of the sleeve or socket $e$, forming part of which are three teeth or projecting lugs, $e^1$, having a clearance-space, $e^2$, between each of the lugs. (See Fig. 2.) By means of the sleeve the coupling can be made to slide along the lever-rod. By its lugs $e^1$ each coupling can secure its turn-bar from moving, and the clearances $e^2$ permit a free and independent action on the part of each turn-bar. By loosening or tightening the set-screw $e^3$, the coupling E can be loosened from or made rigid to the lever-rod. $e^4$ (see Fig. 1) is a proper segment-bar, with ratchet-face, to retain the lever-rod in adjusted position.

Each turn-bar carries a stirrup, $f$, from which projects a stop, $f'$, this latter being fitted to pass through the clearance existing in the coupling in case the turn-bar is to revolve. As a rotary harrow, the turn-bars, with teeth, revolve in the act of harrowing. The couplings E are therefore secured to the lever-rod, so that the stop $f'$ of each turn-bar can freely pass through the couplings. (See Fig. 2.) Also, the said position of the parts is known to the operator by the attitude of the hand-lever, which will always stand vertical when the turn-bars, &c., are to revolve.

The couplings being rigidly secured, by next partially turning the hand-lever (either side from the vertical) the couplings will have one of their lugs brought in line with the stop of the turn-bars, preventing the latter from turning. The action of the teeth can also be suited to harrow deep, shallow, or simply smooth the soil. Thus, to harrow deep, the teeth are set so that their points direct forward. This is done by a partial turn of the turn-bar. Next secure the turn-bar stationary by the engagement of its stop with the properly adjusted and secured coupling. In this condition the harrow is serviceable for hard, rough, or uncultivated soil, the teeth entering deep and upheaving, loosening, and breaking the soil. Likewise the teeth can be set so that their points are directed backward to harrow fine or more cultivated land; or the teeth can be set more perpendicularly, to simply mark or smooth the soil. In all these changes the engagement of the turn-bars with the couplings is effective to render the former rigid or stationary.

My improvements are simple both in construction and operation.

What I claim is—

1. The coupling E, consisting of a sleeve-body, $e$, having projecting lugs $e^1$, and clearance-spaces $e^2$, in combination with the longitudinal lever-rod D, as and for the purposes set forth.

2. The couplings E, consisting of a sleeve-body, $e$, having projecting lugs $e^1$ and clearance-spaces $e^2$, the set-screw $e^3$, the lever-rod D, in combination with the harrow, consisting of a frame, B, having turn-bars $b$, carrying teeth $c$ and stop $f'$, all to operate in the manner and for the purpose set forth.

3. The couplings E, consisting of a sleeve-body, $e$, having projecting lugs $e^1$ and clearance-spaces $e^2$, the set-screw $e^3$, the lever-rod D, and turn-bar carrying the stirrup with stop $f'$, all combined to operate as set forth.

In testimony of said invention I have hereunto set my hand.

CHRISTIAN WIRTH.

Witnesses:
JOHN F. BOYD,
EDWARD WEBER.